United States Patent
Oberg et al.

(10) Patent No.: US 7,343,093 B2
(45) Date of Patent: Mar. 11, 2008

(54) PROTECTED BIDIRECTIONAL WDM NETWORK

(75) Inventors: Magnus Oberg, Hagersten (SE); Ulf Persson, Farsta (SE)

(73) Assignee: Transmode Holding AB, Hagersten (SE)

( * ) Notice: Subject to any disclaimer, the term of this patent is extended or adjusted under 35 U.S.C. 154(b) by 492 days.

(21) Appl. No.: 10/499,147

(22) PCT Filed: Dec. 18, 2002

(86) PCT No.: PCT/SE02/02380

§ 371 (c)(1),
(2), (4) Date: Jun. 18, 2004

(87) PCT Pub. No.: WO03/052978

PCT Pub. Date: Jun. 26, 2003

(65) Prior Publication Data

US 2005/0084262 A1    Apr. 21, 2005

Related U.S. Application Data

(60) Provisional application No. 60/340,493, filed on Dec. 18, 2001.

(30) Foreign Application Priority Data

| Dec. 18, 2001 | (SE) | .................................... 0104170 |
| Jul. 15, 2002 | (SE) | .................................... 0202215 |

(51) Int. Cl.
   *H04B 10/00*    (2006.01)
(52) U.S. Cl. ............................................ 398/3; 398/59
(58) Field of Classification Search ................ 398/3–4, 398/12, 5, 59, 83
See application file for complete search history.

(56) References Cited

U.S. PATENT DOCUMENTS

| 5,510,917 A   | * | 4/1996  | Corke et al. ................... 398/34 |
| 5,886,801 A   | * | 3/1999  | Van Deventer .............. 398/59 |
| 6,321,004 B1  |   | 11/2001 | Duerksen et al. |
| 6,661,946 B2  | * | 12/2003 | Caroli et al. ................... 385/24 |
| 2002/0067523 A1 | * | 6/2002 | Way ........................... 359/119 |

FOREIGN PATENT DOCUMENTS

| WO | 00/28670  | 5/2000 |
| WO | 02/063801 | 8/2002 |

OTHER PUBLICATIONS

Communication pursuant to Article 96(2) EPC for European Application No. 02 793 684.8-2415, dated Jul. 10, 2006.
Japanese Patent Application No. 2003-553756, mailed Aug. 14, 2007.

* cited by examiner

*Primary Examiner*—Christina Leung
(74) *Attorney, Agent, or Firm*—Nixon & Vanderhye P.C.

(57) ABSTRACT

An optical WDM ring network includes at least two add/drop nodes connected in a ring path. The ring path comprises only a single optical fiber arranged for bidirectional traffic between the nodes. A 2×2 switch is used in one of the add/drop nodes for switching signals forwarded from the node to the other node to travel either on a first segment of the ring path or on a second, complementary segment of the ring path when required for protection purposes. Signals from the other node to the first node are issued to travel on both segments but the switch selects the actual segment from which the signals are received in the first node. The signals switches by the switch can be high priority signals used in protected channels communicated between the node and another node. On the segment from which the high priority signals are not received, low priority signals in non-protected channels can be communicated between the nodes, these channels also passing the switch.

36 Claims, 8 Drawing Sheets

PROTECTED BIDIRECTIONAL WDM NETWORK

RELATED APPLICATIONS

This application is the US national phase of international application PCT/SE02/02380 filed 18 Dec. 2002, which designated the US. PCT/SE02/02380 claims priority to SE Application No. 0104170-60 filed 18 Dec. 2001, U.S. Application No. 60/340,493 filed 18 Dec. 2001 and SE Application No. 0202215-0 filed 15 Jul. 2002. The entire contents of these applications are incorporated herein by reference.

TECHNICAL FIELD

The present invention relates to fiber protection in single fiber bidirectional WDM ring networks, in particular to a protected, single fiber bidirectional WDM ring network.

BACKGROUND

Fiber protection is herein defined to be the ability in a fiber network to have all traffic still functional in the case where a fiber segment is broken. Equipment protection is a higher degree of protection that is also more expensive and means that the traffic in the network is functional also in the case that part of the transmission equipment, e.g. lasers, receivers etc., is malfunctioning.

Fiber protection is used when the risk of a failure of any segment of the transmission fiber is relatively high compared to the risk that the rest of the transmission/reception equipment fails, and when a complete equipment protection is too expensive.

Examples of patents describing fiber protection in WDM ring networks are described in U.S. Pat. Nos. 5,680,235, 6,134,036 and 6,278,536, In the networks disclosed in these patents the fiber protection is carried out by switches or other on/off devices connected in the main ring fiber.

Protection in ring networks using communication on two parallel optical fibers to achieve bidirectional communication is disclosed in e.g. U.S. Pat. No. 5,510,917, and published International patent application No. WO 00/28670.

Furthermore, in a WDM ring network, both protected and unprotected channels can exist at the same time. The normal way of using unprotected traffic is to set up a path using equipment devoted only for these channels. If the path is broken, the traffic will be lost. In a protected network, each protected channel has two different paths reserved for it. One of the paths will be active and the other one inactive. In order to be able to send traffic in both paths, some equipment must be doubled. Examples of patents describing protection in combination with switches include the already cited U.S. Pat. Nos. 5,680,235 and 6,134,036, and also U.S. Pat. No. 5,933,258. In published European patent application No. 0 928 082 an example of low priority traffic is described that can be disabled by operating switches.

The concept "low priority channels" as used herein describes channels that may be disabled either by fiber breaks or decisions by switching devices. One kind of low priority channels is the conventional unprotected point-to-point channel. In ring networks, unprotected traffic will use only one of the two possible paths around the ring. The conventional unprotected channel will use its own add-drop filters to connect to the ring and it will be independent of other equipment.

In copending Swedish patent application No. 0101300-2, filed 11 Apr. 2001, and U.S. provisional patent application No. 60/288,422, filed 4 Apr. 2001, corresponding to published International patent application WO 02/084915 and U.S. patent application "Low loss WDM add drop node", filed Nov. 12, 2002, which are all incorporated herein by reference, a WDM ring network is disclosed in which bidirectional traffic is carried on a single fiber.

SUMMARY

It is an object of the invention to provide a single fiber bidirectional WDM ring network having fiber protection requiring, for the protection function, a minimum of active components.

It is another object of the invention to provide a single fiber bidirectional WDM ring network having fiber protection requiring, for the protection function, no switching element or similar device connected in the fiber ring.

It is another object of the invention to provide a protected single fiber bidirectional WDM ring network having facilities for allowing unprotected low priority traffic.

It is another object of the invention to provide a protected single fiber bidirectional WDM ring network utilizing the alternate paths of the protected traffic.

Thus, generally in a single fiber bidirectional WDM ring network for the protection of the fiber transmission paths of the ring, a switching function achieved by a switching element is provided, where the switching function is carried out outside the ring transmission fiber. Thereby the total transmission loss in the network is minimized. This is especially important in optical networks having no optical line amplifiers. Furthermore, for the communication between two considered nodes connected to the ring transmission fiber there is a protection switch connected in only one of the nodes. Then, traffic from the node having the switch is always transmitted on only one of the two ring segments that are obtained from the ring path by dividing it at the considered two nodes. The switch can be controlled to direct the traffic to the other segment when required. The traffic to the node having the switch is always carried on both segments, the switch then selecting the segment from which actually the signals are to be received in the node having the switch.

In the transmission ring a plurality of transmission channels between each pair of nodes can be used and/or a plurality of nodes can be connected in the network and then the protection is selectable on a per channel level or for each pair of nodes between which there is traffic.

In the proposed networks having the special node structures as described herein e.g. the following advantages are obtained.

Less protection switching equipment is needed, one switch only, compared to a conventional network having two fiber rings with one traffic direction per fiber ring.

No switches or other devices performing the same function are connected on the ring fiber itself, thereby reducing losses in the transmission of signals on the ring fiber and increasing the reliability of the ring transmission path.

The fiber protection is selectable on a per channel level alternatively on a per band add-drop filter level. This means that e.g. some channels in a ring network may have fiber protection and at the same time some other channels may have no fiber protection.

The proposed fiber protection can be used in networks having a meshed as well as a hubbed traffic pattern.

Furthermore, in a protected single fiber bidirectional WDM ring network the alternate paths of the protected traffic can be generally used for carrying unprotected low priority traffic. The extra equipment in the inactive path between the protected and unprotected channels is then efficiently used for the low priority traffic.

In a single fiber bidirectional WDM network as considered herein, low priority channels could be added using less equipment than conventional unprotected channels. Furthermore, the fact that bidirectional add-drop filters are used implies that same cross-bar switch can be utilized for both added and dropped traffic.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

The network, herein called a bidirectional WDM network, in which a fiber protection scheme to be described below is applied is described in the above cited Swedish patent application 0101300-2 and U.S. provisional patent application 60/288,422 "Low loss WDM add drop node", filed 11 Apr. 2001, and corresponding applications. This is a WDM ring network in which bidirectional traffic is carried on a single fiber.

Figure 1:
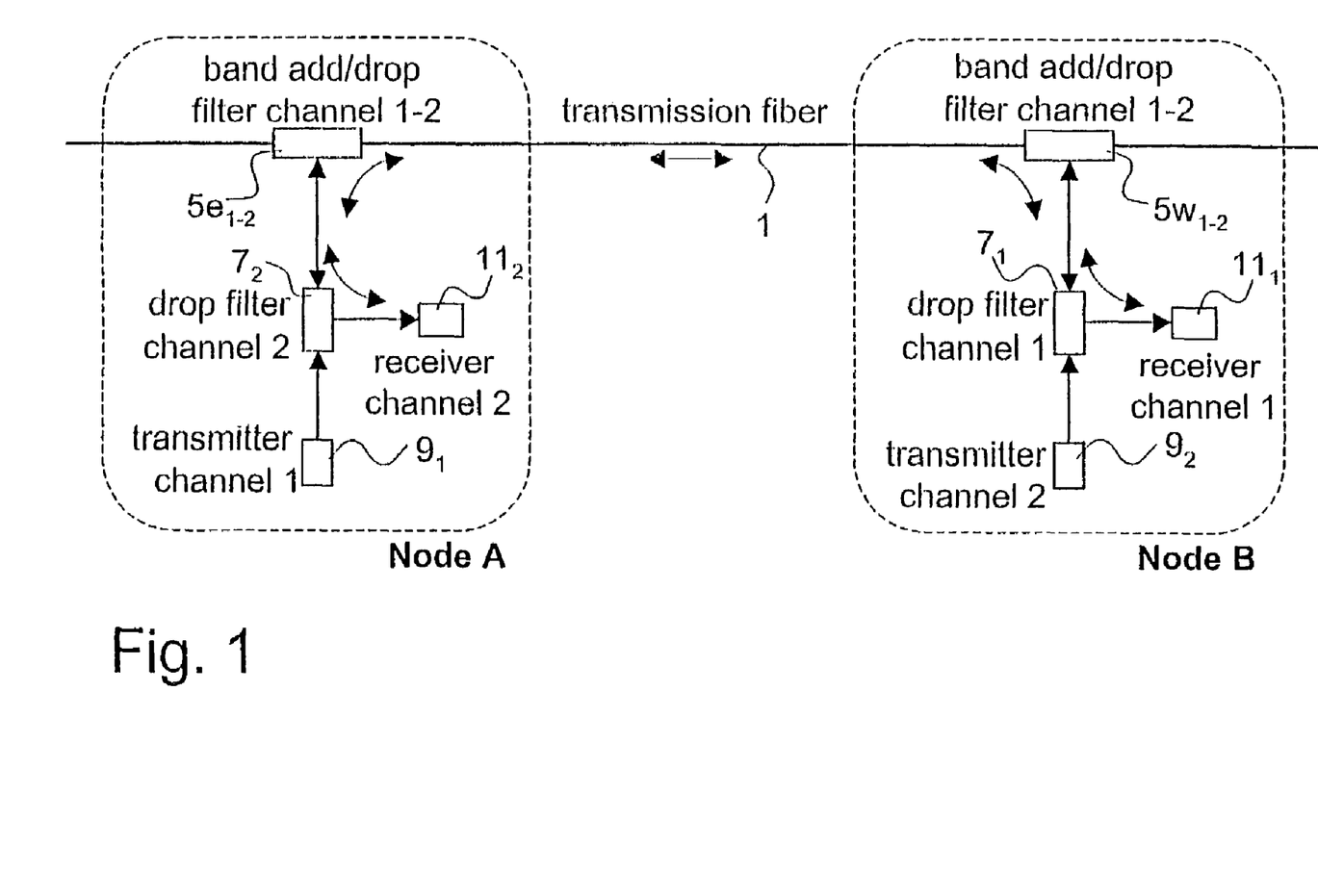
FIG. 1 is a block diagram of a portion of an optical BRIM network including a pair of optical add/drop nodes arranged for bidirectional or duplex communication on a single transmission fiber.

In FIG. 1 the build-up of a WDM add-drop node pair comprising two nodes A, B in such a network is shown. The transmission fiber 1 is used for carrying light signals in the two opposite directions. In the single transmission fiber 1 in node A a two-channel add/drop filter $5e_{1\text{-}2}$, e.g. a band add/drop filter, is connected for adding/dropping light signals in two, preferably adjacent or neighbouring, wavelength channels Nos. 1 and 2 leaving/arriving at the node A from the east where it is assumed that the node B is connected to the right or eastern side of the node A, the nodes A and B for instance only joined by one unbroken fiber portion. Generally, light of wavelengths different from those used for the bidirectional communication between the nodes A and B, i.e. different from the wavelengths used in channels Nos. 1 and 2 in the example of the figure, passes the add/drop nodes A, B on the transmission fiber with a low loss. To the branch port of the two-channel add/drop filter $5e_{1\text{-}2}$ is an internal, single channel drop filter $7_2$ for dropping channel No. 2 connected. It has an express port to which signals outside the dropped channel, i.e. outside the channel No. 2, pass and to this express port is a source of light signals in wavelength channel No. 1 connected, an optical transmitter $9_1$ such as a laser in node A. To the branch port of the single channel drop filter $7_2$ is a light or optical receiver $11_2$ for receiving signals of channel No. 2 connected.

The node B has a structure similar but complementary to that of node A. Thus the two-channel add/drop filter $5w_{1\text{-}2}$ is adapted for only branching traffic from the west, the internal single channel drop filter $7_1$ drops signals of wavelength channel No. 1, the light signal source $9_2$ transmits light only in wavelength channel No. 2 and the receiver $11_1$ is adapted to receive signals in wavelength channel No. 1.

The light signal source $9_1$ in node A generates signals only in wavelength channel No. 1 which are input to the express port of the single channel drop filter $7_2$ in node A. The signals of channel No. 1 thus pass the drop filter $7_2$ with a low loss and are then coupled into the two-channel add/drop filter $5e_{1\text{-}2}$ connected in the transmission fiber 1. Due to the branching direction of the two-channel add/drop filter the signals of channel No. 1 are added to the traffic in the transmission fiber travelling in the eastern direction as seen from node A and hence propagate in the right direction as seen in FIG. 1 until they come to the node B. In the node B the signals of channel No. 1 are dropped in the two-channel add/drop filter $5w_{1-2}$ of node B and are therefrom coupled to the internal, single channel drop filter $7_1$ of node B. All the light of wavelength channel No. 1 is dropped in the internal, single channel drop filter and is communicated to the receiver $11_1$ of node B.

As to signals in the opposite direction, in the node B the light signal source $9_2$ transmits light signals only in wavelength channel No. 2. The signals pass in the reverse direction through the internal, single channel drop filter $7_1$ with a low loss, are coupled into the branching port or add/drop port of the two-channel add/drop filter $5w_{1-2}$ and propagate in the western or left direction in the transmission fiber 1 together with other traffic in same direction. In the node A the considered channel No. 2 signals are dropped in the two-channel add/drop filter $5e_{1-2}$, are coupled into the single channel drop filter $7_2$ and are dropped in that filter and further coupled into the receiver $11_2$ of the node A.

If the two-channel add/drop filters $5e_{1-2}$ and $5w_{1-2}$ are of band add/drop type, the wavelength channels used for bidirectional communication between a pair of nodes, i.e. channel Nos. 1 and 2 in the example described above should preferably, as has been indicated above, be neighbours or adjacent, so that thereby these filters $5e_{1-2}$, $5w_{1-2}$ block as few other wavelength channels as possible and preferably none.

Figure 2:
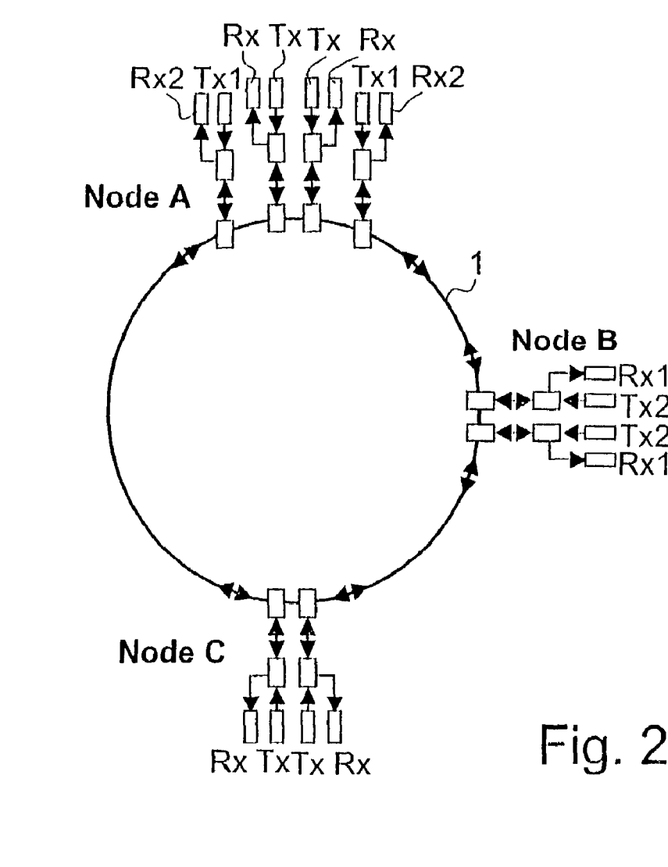
FIG. 2 is a diagram of an optical fiber WDM ring network arranged for bidirectional communication on a single transmission fiber between a hub node and two subnodes.

In FIG. 2 a WDM single fiber ring network having three nodes A, B, C is illustrated in which the node construction of FIG. 1 is used. The node A is a hub node communicating with the two other nodes B, C on totally four different logical links, two links for each subnode B, C, each link involving two different wavelengths. Thus, e.g. node A includes four sets of the node construction shown in FIG. 1, each set having a band add/drop two-channel filter individually connected in the fiber ring that comprises the transmission fiber 1.

One of the main advantages of the ring structure is that there are always two paths around the ring in between any pair of nodes. If the fiber in one segment of the ring is broken, a connection between a pair of nodes can be established on the remaining segment or segments of the ring.

A conventional method of obtaining fiber protection is to transmit the signal over both paths around the ring by using power splitting. This is exemplified in the networks illustrated in FIGS. 3a, 3b where only one pair of nodes A, B is shown, using for the communication in the network of FIG. 3a only one wavelength channel and for the single fiber network of FIG. 3b two channels.

Figure 3A:
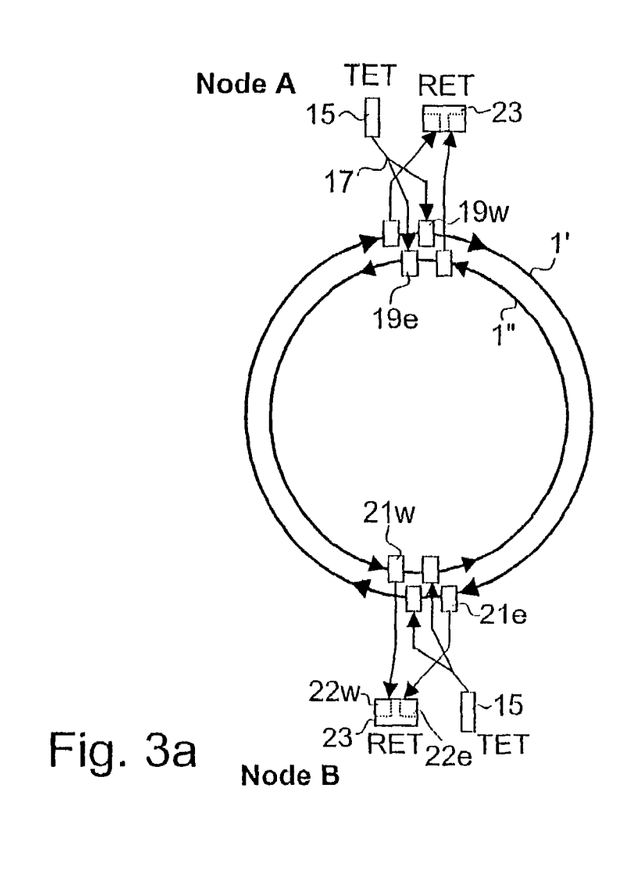
FIG. 3a is a diagram of an optical fiber WDM ring network according to prior art having two parallel transmission fibers, each transmission fiber carrying only traffic in one direction.

In the diagram of FIG. 3a an example of conventional fiber protection in a standard two fiber ring solution is shown, where each transmission fiber 1', 1" carries traffic in one direction only. For traffic from node A to node B, the signal from a WDM transmit end transponder, TET 15, in node A is split to be carried by two fibers by a conventional fiber coupler 17 and then added by using optical filters 19e, 19w onto the parallel ring fibers 1', 1". After being added, the right part of the signal is propagating in the outer ring fiber 1a along the right side of the ring in a clockwise direction, and the left part of the signal is propagating in the inner ring fiber 1b along the left side of the ring in an anti-clockwise direction. The signal in the right side of the ring is dropped by the right drop filter 21e in node B. The signal in the left side of the ring is dropped left drop filter 21w in node B. The two identical signals from the left and right single channel drop filters in node B are directed to two opto-electrical receivers, O/E Rx 22w, 22e, which both are part of a specially designed receive end transponder, RET 23. The signals from node B to node A are transmitted in the similar way.

Figure 3B:
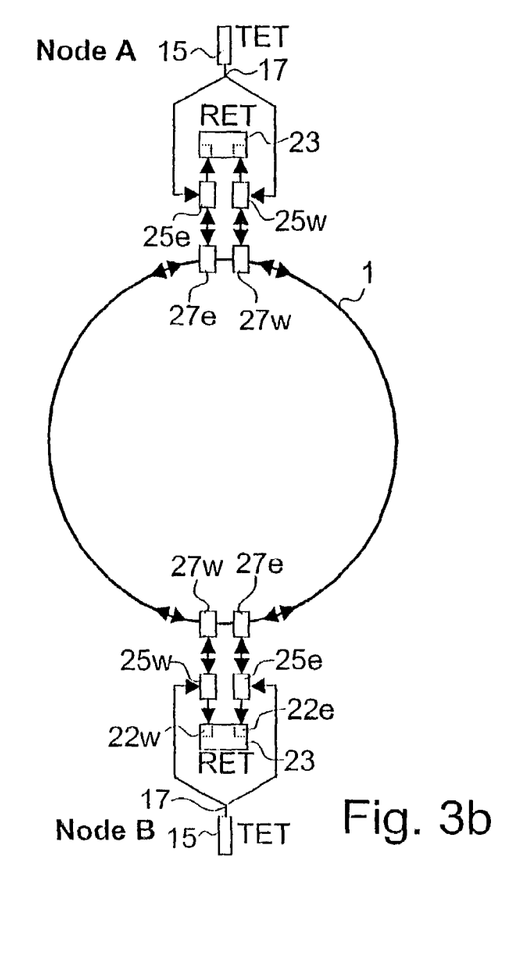
FIG. 3b is a diagram of an optical fiber WDM ring network arranged for bidirectional communication on a single transmission fiber and having protection arranged according to the principle of FIG. 3a, FIG. 4 is a diagram of an optical fiber WDM ring network arranged for bidirectional communication on a single transmission fiber and having protection using a single switching element for each bidirectional communication link.

In the network illustrated in FIG. 3b the same principle of fiber protection is shown as applied in a single fiber ring solution according to the above cited patent applications where the bidirectional traffic is carried on a single fiber. Exactly in the same way as in the network of FIG. 3a, for the traffic from node A to node B, the signal from the WDM TET 15 in node A of the network of FIG. 3b is split into two fibers by a conventional fiber coupler 17 and then added by first passing single channel add/drop filters 25e, 25w, through the express ports thereof, and then band add/drop optical filters 27e, 27w onto the single ring fiber 1, these band add/drop optical filters thus connected in the fiber ring. After beings added, the right part of the signal is propagating along the right side of the ring in a clockwise direction, and the left part of the signal is propagating along the left side of the ring in an anti-clockwise direction. The signal in the right side of the ring is dropped by the right band add-drop filter 27e in node B and then demultiplexed by the right single channel drop filter 25e. The signal in the left side of the ring is dropped by the left band add-drop filter 27w in node B and then demultiplexed by the left single channel drop filter 25w. The two identical signals from the left and right single channel drop filters in node B are directed to two opto-electrical receivers 22w, 22e, which both are part of the special receive end transponder 23 of node B. The traffic from node B to node A is propagated in the similar way.

In a normal case, as illustrated in FIGS. 3a and 3b, where the transmission ring 1 is unbroken, the two opto-electrical receivers 22w, 22e of each RET 23 receive the same signal, but only one of them is active. If the fiber segment from which the active operating receiver receives its signal is cut off, this receiver looses its input signal and is therefore deactivated. Simultaneously, the other receiver comprised in the special RET 23 will be activated and thus traffic will be restored. The switching mechanism in this case is either that the two receivers 22e, 22e are connected to an electrical combiner, not shown, and the two receivers are being switched between on- and off-states, or that both receivers are always on, receiving signals, and only one at a time are selected by an electrical switch, not shown. The output from such a combiner/switch then passes the signal on to the rest of the circuits of the RET 23 to produce the output signal. In this way traffic incoming to the node will always reach the output of the RET 23, even in the case of a fiber break.

As an alternative, instead of having a RET including two opto-electrical receivers, as shown in FIGS. 3a and 3b, it is possible to have a single optical 2×1 switch, or possibly a 2×2 cross-bar switch, not shown, connected in between the two single channel drop filters 27w, 27e and a normal RET 23 having a single receiver. The RET will in this case always be on and the switch will choose the side of the ring from which to receive the signal.

This protection scheme is identical in the other direction, i.e. for signalling travelling from node B to node A. This means that two special RETs 23 including each two opto-electrical receivers are required for a bidirectional communication channel, or alternatively that two 2×1 or 2×2 switches are needed. As will be apparent from the following description of an alternative node structure only one switch per bidirectional communication channel is required.

Thus, in a network similar to that shown in FIG. 3b, in which the single ring fiber 1 carries bidirectional traffic, the fact that the traffic in between the band add-drop filters 27w, 27e and the single channel drop filters 25w, 25e is also bidirectional can be utilized to obtain a simplified fiber protection scheme using less equipment.

Figure 4:
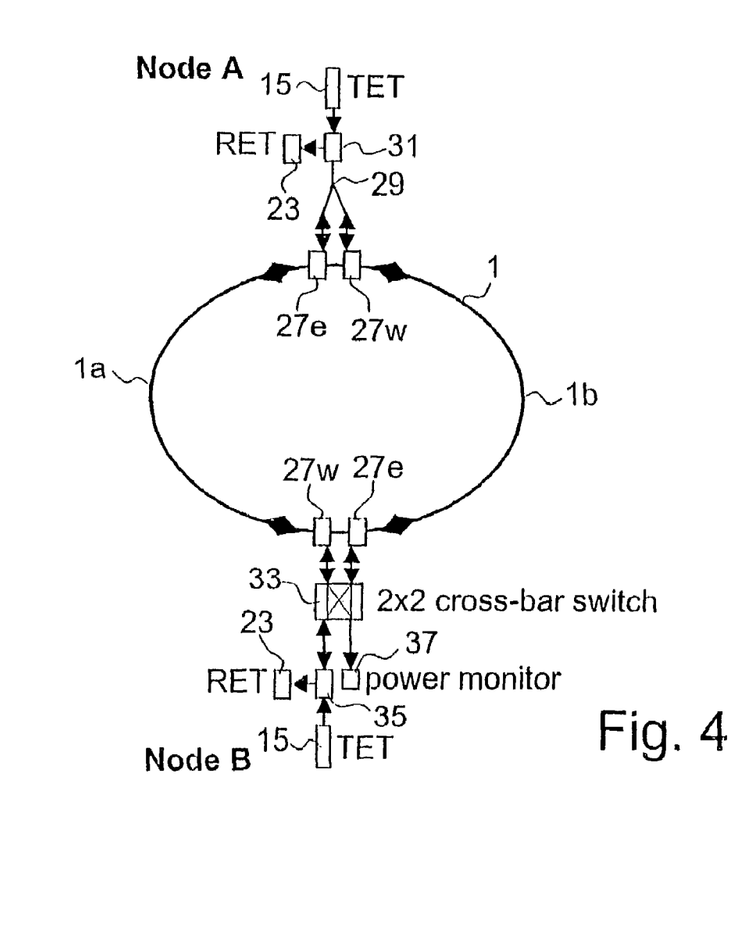

A first embodiment of a network having nodes of a simplified structure is shown in FIG. 4. For clarity, only one pair of nodes A, B is shown. The invention is not limited to this case since more nodes and several channels in each node, working on wavelengths different from those of the shown node pair, are usually present in a network, and they can be treated in a similar way.

In node A, a conventional 1×2 fiber coupler 29, i.e. a wavelength independent power splitter/combiner, is placed in between a single channel drop filter 31 and two band add-drop filters 27e, 27w connected in the transmission ring. The WDM signal output from the TET 15 of node A can be assumed to e.g. be carried on channel No. 1. It passes the single channel drop filter 31, through the express port thereof, with a low loss and is then split into two signals carried on the two branches by the 1×2 coupler 29. The left branch is connected to the left band add-drop filter 27e which adds the signal on-to the traffic in the left side of the ring fiber 1, where the signal propagates in the anti-clockwise direction. The right branch of the 1×2 fiber coupler 29 is connected to the right band add-drop filter 27w which adds the signal onto the right side of the ring fiber, where the signal propagates in the clockwise direction.

This means that the same signal is received by, the two band add-drop filters 27w, 27e in node B. The output from these two band add-drop filters are connected to the two upper ports of a 2×2 optical cross-bar space switch 33. Such switches are commercially available from for example JDS Uniphase and have four ports, two of the ports called herein upper ports and the other two ports lower ports. In a first state of such a switch, called the bar state, the first or left upper port is connected to the lower, left lower port and the second, right upper port is connected to the second, right lower port. In a second state, called the cross state, the right upper port is connected to the left lower port and the left upper port is connected to the right lower port. The lower left port of the 2×2 cross-bar switch 33 is connected to a single channel drop filter 35, and the signal from node A is dropped in this filter and is connected to a RET 23. The lower right port of the 2×2 switch can be connected to an optical power detector 37.

If the 2×2 cross-bar switch 33 is in the bar state, i.e. in the case where its upper left port is connected to its lower left port and its upper right port is connected to its lower right port, the RET 23 in node B receives the signal that has passed through the left side of the ring 1, and the power detector 37 monitors the signal that has passed through the right side of the ring.

If the 2×2 cross-bar switch 33 is in the cross state, i.e. in the case where its upper left port is connected to its lower right port and its upper right port is connected to its lower left port, the RET 23 in node B receives the signal that has passed through the right side of the ring 1, and the power detector 37 monitors the signal that has passed through the left side of the ring.

Traffic from node B to node A can e.g. be assumed to carried on channel No. 2 in the case where traffic from node A to node B is carried on channel No. 1. The signals of the traffic are transmitted from the TET 15 in node B, pass the single channel drop filter 35, through the express port thereof, in node B with a low loss, and are input to the lower left port of the 2×2 cross-bar switch 33.

If the 2×2 cross-bar switch 33 is in the bar state, the signals from the TET 15 in node B pass to the left band add-drop filter 27w in node B, propagate in the clockwise direction on the left side of the ring 1, are dropped in the left band add-drop filter 27e in node A, are input to the single channel drop filter 31 via the 1×2 fiber coupler 29, and are received by the RET 23 in node A. No signal is propagating from node B to node A in the right side of the ring since nothing is transmitted from the power detector 37 connected to the lower right port of the 2×2 switch 33.

If the 2×2 cross-bar switch 33 is in the cross state the signal from the TET 15 in node B goes to the right band add-drop filter 27e in node B, propagates in the anti-clockwise direction on the right side of the ring 1, is dropped in the right band add-drop 27w filter in node A, is connected to the single channel drop filter 31 via the right arm of the 1×2 fiber coupler 29, and is received by the RET 23 in node A. No signal is propagating from node B to node A in the left side of the ring.

It shall be noted that the RETs 15 in this case are standard RETs comprising only one opto-electrical receiver each.

Assume that the 2×2 switch 33 is in the bar state in the normal case when all parts of the network are functional. This means that the traffic from node A to node B is transmitted through both the left and the right side of the ring to the two band add/drop filters 27 in node B. The traffic going through the left side of the ring will reach the RET 23 in node B via the 2×2 switch 33 and the single channel drop filter 35, whereas the traffic going through the right side of the ring will be monitored by the power monitor 37 in node B. The traffic from node B to node A will only go through the left side of the ring 1.

If a fiber break occurs on the right side of the ring the traffic between node A and B will be unaffected. However, the signal to the power monitor 37 will be lost and thereby an alarm that the protection path is not functional will be issued.

If a fiber break occurs on the left side of the ring the traffic between node A and B will be lost. The RET 23 in node B will loose its input signal and therefore issue an alarm and signal to the 2×2 switch 33 to change from bar to cross state. Alternatively, a fiber tap coupler, not shown, connected to a power monitor can be placed on the short fiber segment in between the single channel drop filter 35 and the RET 23 or in between the lower left port of the 2×2 switch 33 and the single channel drop coupler filter. If this monitor looses its input power an alarm will be issued that signals to the 2×2 switch 33 to change from bar to cross state. When the switch has reached the cross state the signal from node A to node B propagating in the right side of the ring 1 will now reach the RET in node B, and the traffic from node B to node A will now propagate along the right side of the ring. In this way traffic is restored.

If monitoring of the protection path is considered unnecessary the power monitor such as 37 can be omitted and the 2×2 cross-bar switch 33 can be replaced by an 2×1 space switch, not shown, in which the fixed one port is connected to the single channel drop filter 3 in node B and the two ports between which switching can be made are connected to the two band add-drop filters 27w, 27e in node B.

Figure 5:
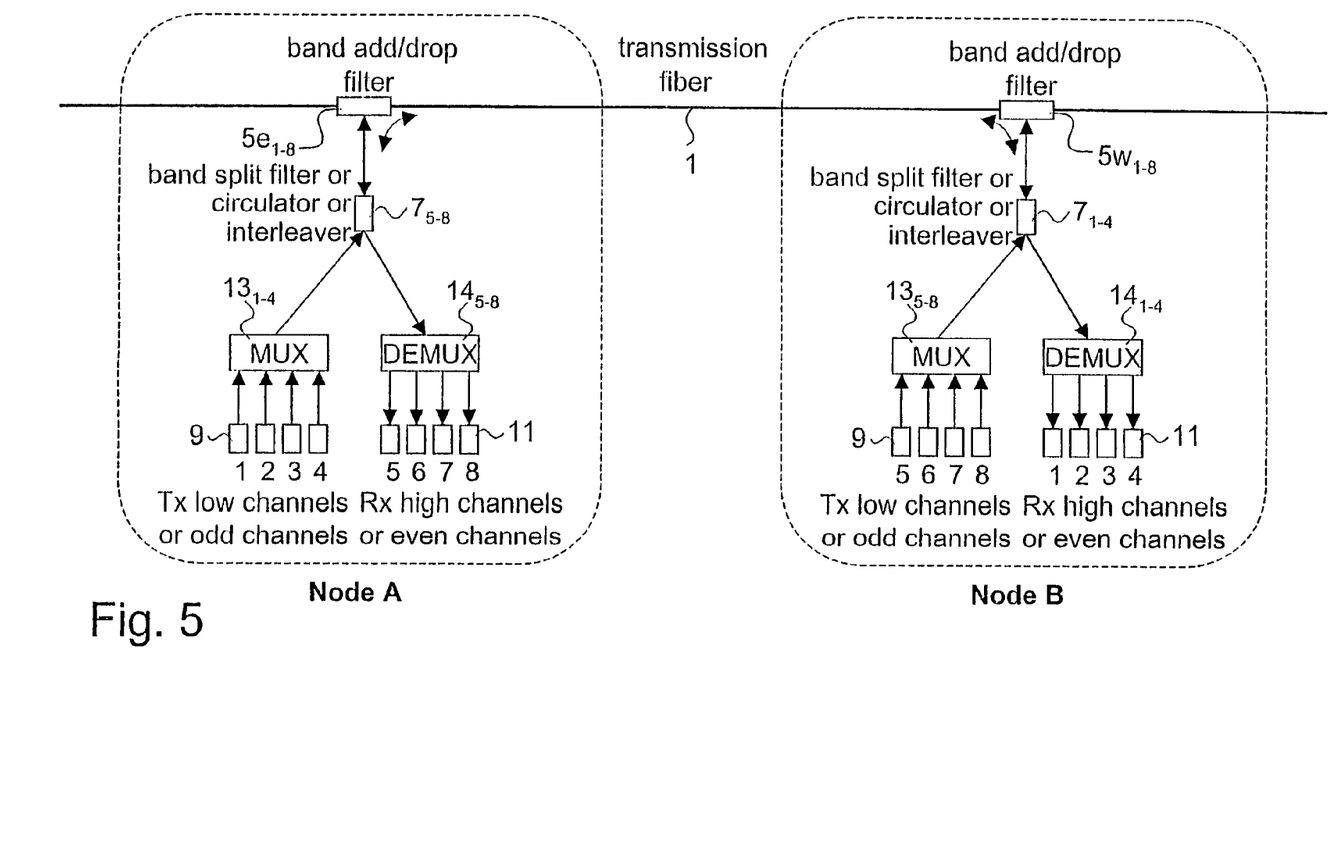
FIG. 5 is a block diagram of a portion of an optical WDM network similar to that of FIG. 1, the nodes arranged for bidirectional or duplex communication on a single transmission fiber in several channels.

A second embodiment of the simplified node structure is obtained when applying the structure illustrated in FIG. 4 to the node structure of FIG. 10 of the above cited patent applications. This alternative basic node structure described in these patent applications allow bidirectional communication on several channels and is shown in FIG. 5. Several channels, e.g. channels Nos. 1-4 in node A and channel Nos.

5-8 in node B, are added onto the traffic in the transmission fiber 1 using one multi-channel add/drop filter, $5e_{1-8}$ or $5w_{1-8}$, and several channels, e.g. channels Nos. 5-8 in node A and channels 1-4 in node B, are dropped from the traffic in the transmission fiber using the same multi-channel add/drop filter. The channels of the multi-channel add/drop filter $5e_{1-8}$ or $5w_{1-8}$ which can be a band add/drop filter includes the wavelengths of all the used channels, e.g. channels Nos. 1-8 in the example shown in the figure. The wavelengths of the added channels can be separated from those of the dropped channels by e.g. having one group being long wavelengths and the other being short wavelengths. The internal single channel drop filter $7_2$ in node A in FIG. 1 is then replaced by generally a multi-channel drop filter, such as a wavelength band split filter or a band drop filter $7_{5-8}$ having a suitable bandwidth, in the example the dropped channels including the channels Nos. 5-8. The single channel drop filter $7_1$ in node B in FIG. 1 is similarly replaced by a multichannel drop filter $7_{1-4}$ such as a band drop filter having a band including the wavelengths of channels Nos. 1-4.

As an alternative, the wavelengths of the channels added in a node, node A or B in the figure, can be separated from those of the dropped channels by having one group being odd numbered channels and the other group being even numbered channels, the numbering of the channels being made sequentially for e.g. increasing wavelengths. Then, instead of the internal band split or drop filters $7_{5-8}$ and $7_{1-4}$ optical interleaver filters are used letting every second channel through and branching every other channel, for instance branching or deflecting channels Nos. 2, 4, 6, 8 in node A and branching channel Nos. 1, 3, 5 7 in node B.

Another alternative is to have an optical circulator that directs the traffic from the multiplexer to the respective band add-drop filter $5e_{1-8}$, $5w_{1-8}$ and directs the traffic coming from the band add-drop filter to the demultiplexer.

Connected to the internal multi-channel drop filter. i.e. the band split filter $7_{5-8}$ or $7_{1-4}$, alternatively an optical interleaver filter, is an optical multiplexer $13_{1-4}$ or $13_{5-8}$ for receiving and combining the add channels and an optical demultiplexer $14_{5-8}$ or $14_{1-4}$ for filtering out the individual drop channels. The optical multiplexers are thus connected to receive light from light sources such as transmitters $9_1$, $9_2$, . . . for the respective channels and combine the light issued thereby to a single combined signal. The optical demultiplexers are connected to transmit the demultiplexed light signals to light receivers $11_1$, $11_2$, . . . for the respective channels.

Figure 6:
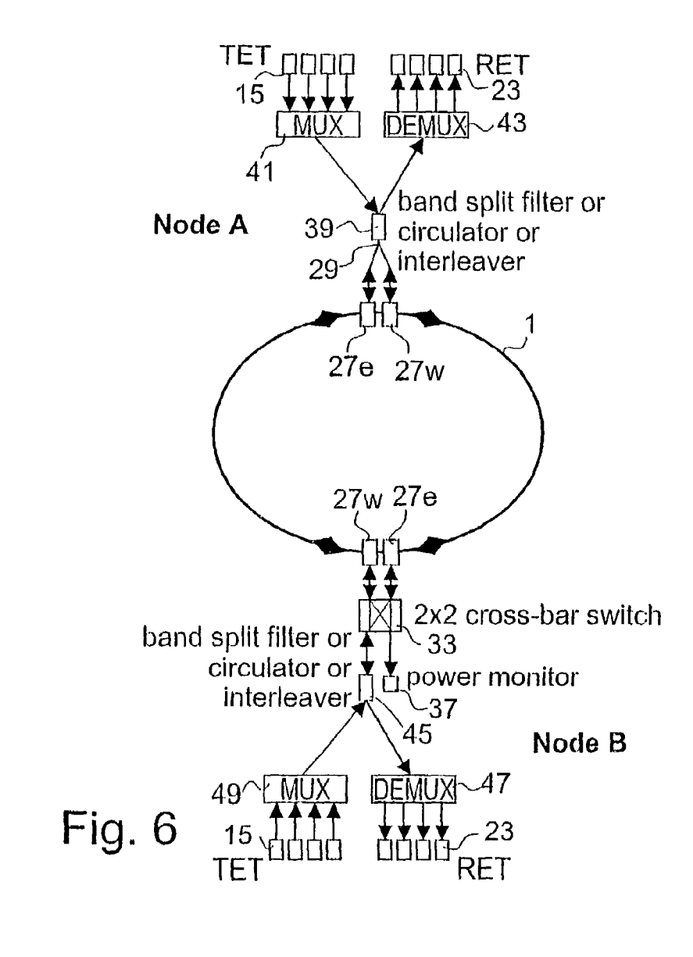
FIG. 6 is a diagram of an optical fiber WDM ring network arranged for bidirectional communication on a single transmission fiber between two nodes in several channels and having protection using a single switching element.

When applying the concept of the simple node structure as illustrated in FIG. 4 to the basic node structure of FIG. 5 the network and node structures shown in FIG. 6 are obtained. Similarly to the structure illustrated in FIG. 4, a 1×2 fiber coupler 29 is connected to the left and right band add-drop filters 27e, 27w in node A. The other end of the 1×2 coupler is connected to a combiner/splitter element 39 that can comprise a band split filter, an optical interleaver or an optical circulator. The WDM channel traffic output from the TETs 15 in node A is combined in an optical multiplexer 41, the output of which is connected to the combiner/splitter element 39. To the same side of the element 39 also the RETs 23 of node A are connected through an optical demultiplexer 43.

The traffic from the TETs 15 of node A propagates along both sides of the ring fiber 1 to the band add-drop filters 27w, 27e in node B. Similarly to the construction shown in FIG. 4, the left band add-drop filter 27w is connected to the upper left port of a 2×2 optical cross-bar space switch 33, and the right band add-drop filter 27e is connected to the upper right port of the same switch.

The lower right port of the 2×2 switch can be connected to a power monitor 37, in order to monitor the protection path of the ring. The lower left port of the 2×2 switch is connected to a combiner/splitter element 45, that can comprise a band split filter, an optical interleaver or an optical circulator 45 and that forwards the incoming signals to a demultiplexer 47 and from there to the individual RETs 23 or WDM-receivers in node B. The combiner/splitter element 45 is also connected to a multiplexer 49 receiving and combining signals from the TETs 15 of node B.

The traffic from node B to node A propagates along the left side of the ring if the 2×2 switch 33 is in bar state, and just as the network in FIG. 4, the 2×2 switch will change from bar to cross state in the case of a fiber break on the left side of the ring occurs, in order to restore traffic.

Figure 7:
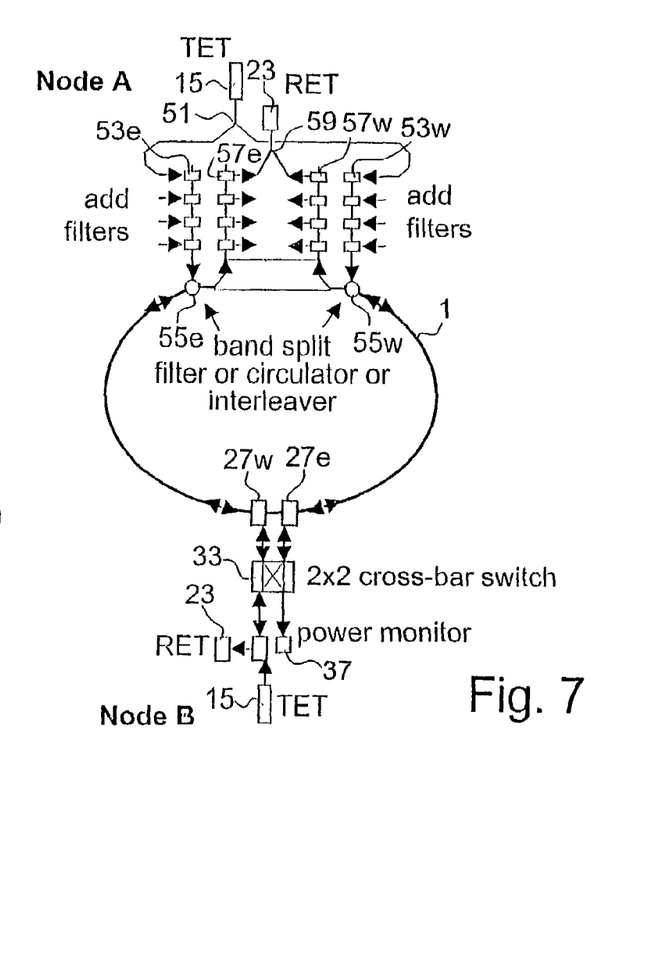
FIG. 7 is a diagram of an optical fiber WDM ring network similar to that of FIG. 6 but having a different construction of one of the nodes.

A third embodiment of a network having a simplified node structure is shown in FIG. 7. In this network node A is usually a hub node, i.e. a node which has a direct optical channel to most other nodes and in which all traffic is optically terminated. The WDM signal from each of the TETs 15 in node A is optically split in two parts or shares by a simple 1×2 coupler/splitter 51. Each resulting signal is first connected to the add port of a single channel add filter 53e, 53w, then passes through the express ports of a number of other, similar single channel add filters connected to other TETs of the node and is then coupled to the ring fiber 1 through a wavelength combiner/splitter element 55e, 55w that can comprise a band split filter, an optical circulator or an interleaver. This element is thus connected in the fiber ring 1.

Signals to the node A from node B are at the node A first coupled through the same band split filter/optical circulator/interleaver 55e, 55w to another fiber branch inside node A to which single channel optical drop filters 57e, 57w are connected. A certain wavelength channel passes through a number of express ports of these single channel drop filters until it is dropped by a filter having a matching drop wavelength. The dropped channel is forwarded to a corresponding RET 23 in node A through a combiner 59, a simple coupler.

For protection reasons node A has two identical sides including a complete setup of add filters 53e, 53w, drop filters 57e, 57w and a band split filter/optical circulator/interleaver 55e, 55w. Each of the optical 1'2 fiber couplers 51, only one shown in the figure, are connected from the TETs 15 to an add filter 53e, 53w on each side of the node and the drop filters 57e, 57w on each side of the node A are connected to the RETs 23 via the 2×1 optical fiber couplers 59, only one shown in the figure.

By this node build-up node A will transmit identical signals to the two sides of the ring 1, and it will also have the ability to receive a signal irrespectively of the side of the ring from which the signal is coming.

Each of the two sets of serially connected add filters 53e and 53w can be replaced by a single optical multiplexer, not shown. In the similar way, each of the two sets of serially connected single channel drop filters 57e and 57w can be replaced by a single optical demultiplexer, not shown. However, the use of separate add filters and separate drop filters gives the node a modular structure that can be favorable in some cases.

The design of node B can be similar to that of the node B shown in FIGS. 4 or 6. The switching function for protection purposes in node B will be the same as in the networks illustrated in these figures.

Figure 8:
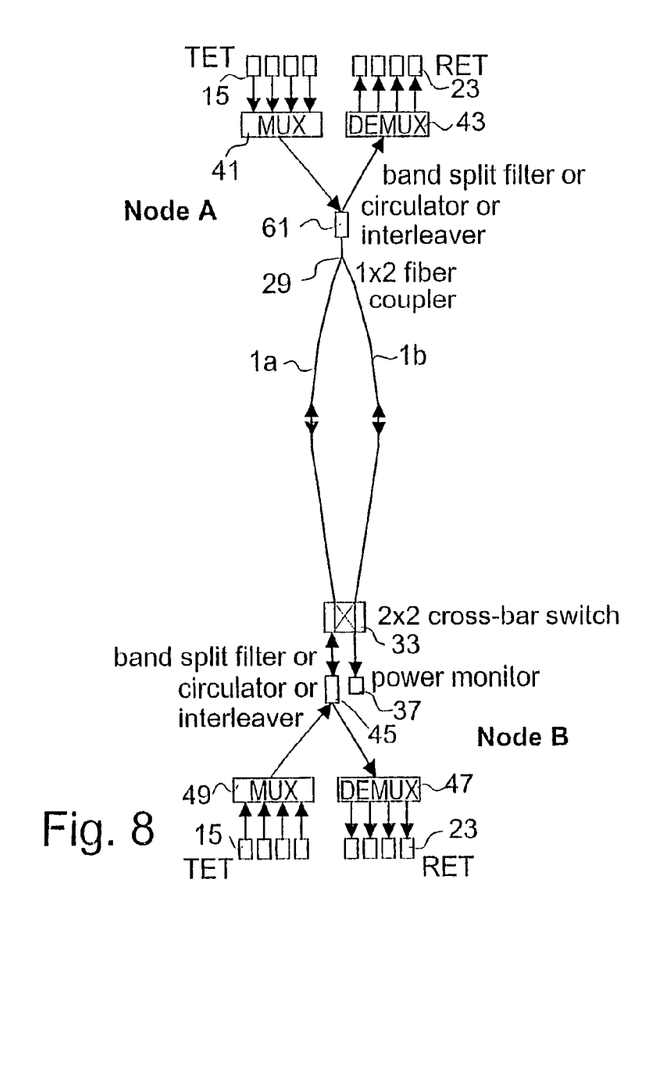
FIG. 8 is a diagram of an optical fiber WDM network having only two nodes but operating similar to the network of FIG. 6, FIGS. 9a, 9b are block diagrams of optical bidirectional WDM ring networks allowing protected traffic between two nodes and having a low priority channel.

A fourth embodiment of a protected network having simplified node structures is shown in FIG. 8. The figure shows a degenerated ring network that is actually a point-to-point network having two end nodes only and comprising two optical fiber segments 1*a*, 1*b*. The network is similar to that shown in FIG. 6, but since it is not a ring network comprising more than two nodes the band add-drop filters 27*e*, 27*e* can be omitted. Connected directly to the single terminal side of the band split filter/optical interleaver/optical circulator 39 in node A is a 1×2 fiber coupler 61, compare the fiber coupler 29 of FIGS. 4 and 6, that has its parallel arms connected to the left and right segments 1*a*-1*b* of the fiber path 1. In node B the right and left fiber segments are connected directly to the right and left upper ports of the 2×2 cross-oar switch 33.

If the 2×2 switch 33 is normally in bar state the left fiber segment 1*a* is used as the working path and the right segment 1*b* is used as the protection path. In the case of a fiber break on the left segment the switch changes to the cross state and the communication is restored to instead be carried on the right fiber segment 1*b*. In order to obtain good protection of the traffic between the two nodes, the two optical fiber segments 1*a*, 1*b* should be located geographically separated from each other.

Thus, protected networks having simplified node structures have been described, the networks in particular requiring less protection switching equipment, one switch only, compared to a conventional network having one traffic direction per fiber. Furthermore, no switches are connected in the ring fiber itself, thereby reducing the loss on the ring fiber and increasing the reliability of the ring transmission path. The protection in the networks as described above is selectable on a per channel level, per node level or per band add-drop filter level.

The invention, as described with reference to FIGS. 4, 6 and 7 is not limited to the case of only two nodes as illustrated in these figures since more nodes and several channels in each node that work on wavelengths different from those of the shown node pair are usually present in these networks, and these can be treated in a similar way.

In protected WDM networks also low priority channels can exist. Such channels are in principle unprotected and thus can be disabled either by fiber breaks or decisions by switching devices. An example of a low priority channel is the conventional unprotected point-to-point channel. In ring networks, unprotected traffic uses only one of the two possible paths around the ring. The unprotected channel uses conventionally its own add-drop filters to connect to the ring and it is independent of other equipment. The diagrams of FIGS. 9*a* and 9*b* show two examples of unprotected channels used in the same ring as a protected channel.

Figure 9A:
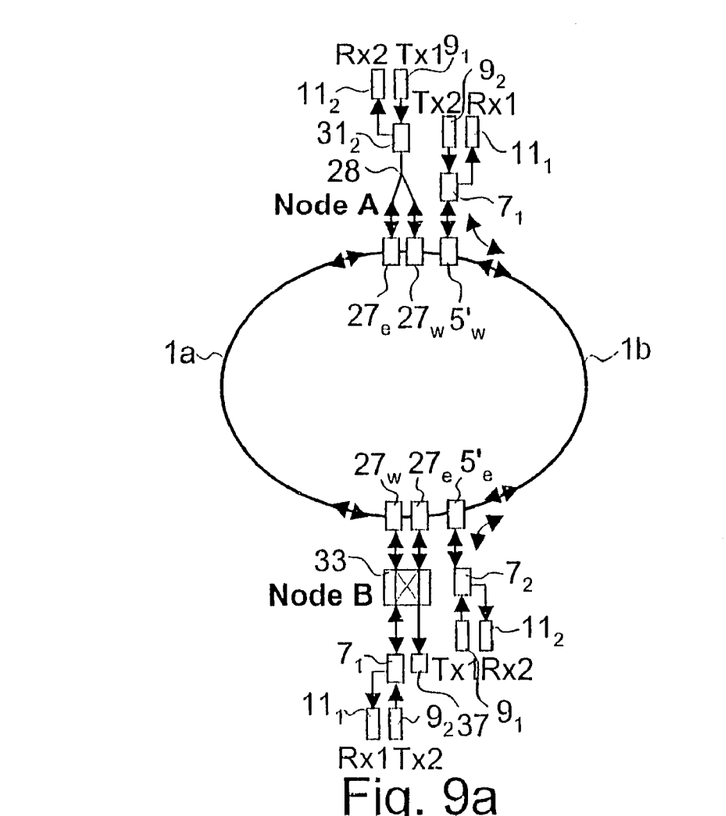
Figure 9B:
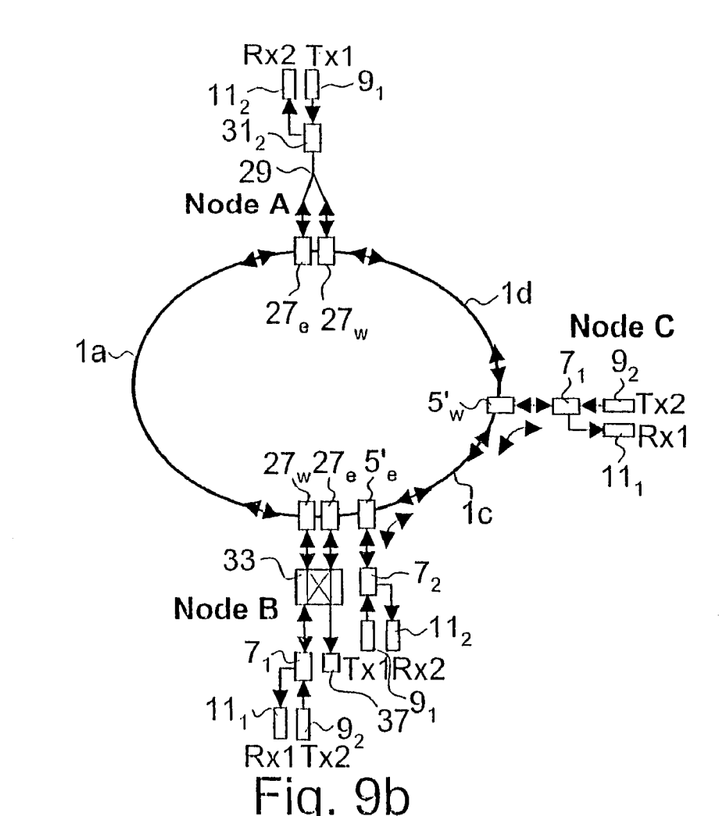

The networks of FIGS. 9*a* and 9*b* are obtained by superposing a simple link of the kind illustrated in FIG. 1 on the network of FIG. 4. In FIG. 9*a* there are only two nodes A, B but in the network of FIG. 9*b* one of the nodes of the simple link is located in a separate node C, the other node of the link being combined with node B of the ring network. Thus in FIG. 9*b* the ring is composed of three fiber segments 1*a*, 1*c*, 1*d*.

The left filters 27$_w$, 27$_e$ in node B carry the protected channel whereas the right filter 5$_e$' in node B carries the unprotected channel. In FIG. 9*a*, the unprotected channel uses the right path 1*b* of the ring to connect between node B and A. In FIG. 9*b*, unprotected traffic is sent from node B to the node C. The protected signal can be sent from node B to A in either the clockwise or counter clockwise direction around the ring as determined by the setting of the switch 33.

In the cited European patent application No. 0 928 082 the low priority traffic is disabled by switches. A standard two-fiber ring 1', 1" is used and four 2×2 cross-bar switches 63 are needed to carry out the protection function, see the diagram of FIG. 10 of the present application showing a ring having this kind of protection scheme. Only three ports in each 2×2 cross-bar switch are needed for the protection channel. Hence, the last port in each switch 63 can be used to connect low priority channels.

Figure 10:
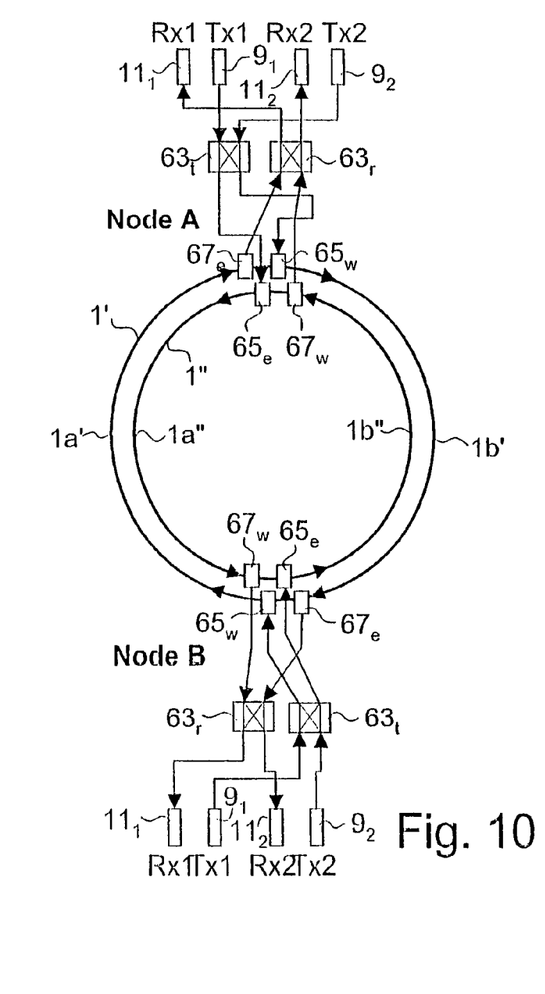
FIG. 10 is a block diagram of an optical WDM network comprising two parallel fiber rings for communication between two nodes in one protected channels and one non-protected, low priority channel.

In each node A, B there is one add coupler 65$_w$, 65$_e$ for each direction and one drop coupler 67$_w$, 67$_e$ for each direction, the couplers for different directions connected in different fiber rings 1', 1". Two wavelength channels Nos. 1 and 2 are used, transmitters 9$_1$, 9$_2$ and receivers 11$_1$, 11$_2$ for these channels being provided in each node. The transmitters of a node are connected to a cross-bar switch 63$_t$ and the receivers to a cross-bar switch 63$_r$, the switches also connected to the add couplers and the drop couplers, respectively, that are connected in the ring.

When all switches 63$_t$, 63$_r$ are set to the bar state, the protected channel No. 1 is transmitted from node A to node B in the counter clockwise direction through the inner ring 1" on the fiber segment 1*a*". At the same time, channel No. 1 is transmitted from node B to node A in the clockwise direction in the outer ring 1' on the fiber segment 1*a*'. In the same way, traffic between node A and B is established for channel No. 2 in the right part of the ring, i.e. on the fiber segments 1*b*', 1*b*". When all switches are set to the cross state, channel No. 1 uses the right part of the ring for its transmission and channel No. 2 uses the left part.

If channel No. 1 carries the high priority traffic, the switches will be set to those states that ensure that traffic in this channel will reach its destination even if one part of the ring has a break. In this case, channel No. 2, which carries the low priority traffic, will be disabled if any part of the ring fails. In order to get the functionality including low priority traffic in a two-fiber ring having separate add and drop filters, hence four 2×2 cross-bar switches are needed.

Figure 11:
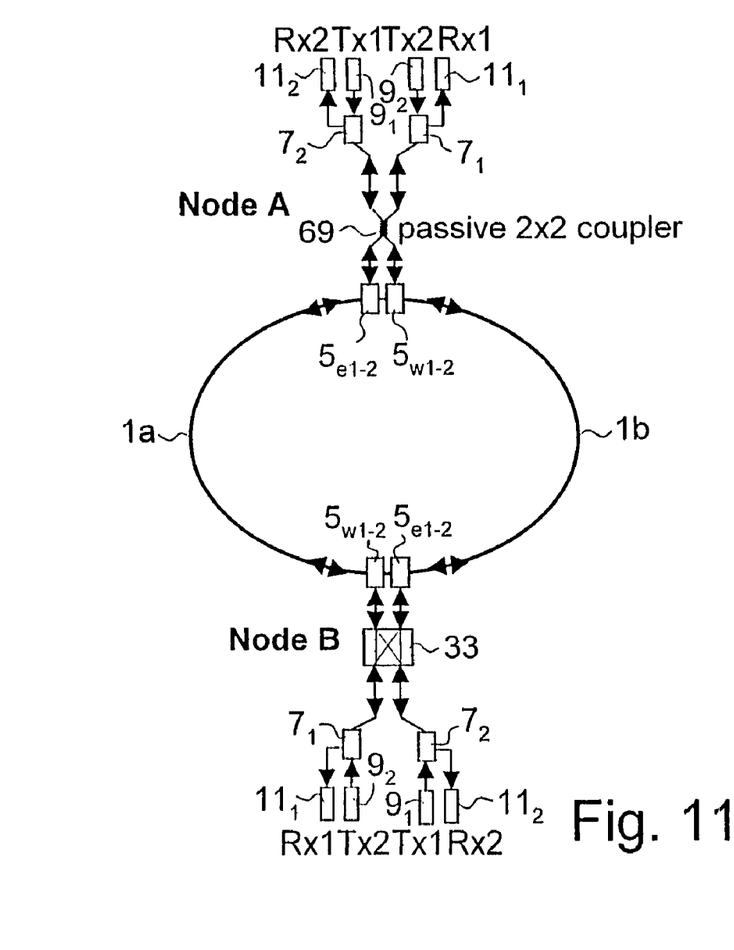
FIG. 11 is a block diagram of an optical bidirectional WDM ring network allowing protected and low priority traffic between two nodes and having a minimum number of components.

In FIG. 11 a simple network comprising two nodes A, B connected in a simple fiber ring having segments 1*a*, 1*b* is shown, the network allowing high priority communication in two channels and also, in the non-protected state, low priority communication in the same channels. In the nodes two transmitter/receiver pairs are provided, each pair comprising one transmitter 9$_1$, 9$_2$ and one receiver 11$_2$, 11$_1$, the transmitters of the pairs working in different wavelength channels Nos. 1 and 2. The transmitter/receiver pairs of one, node, node B in the figure, are through drop filters 7$_2$, 7$_1$ connected to a 2×2 cross-bar switch 33. In the other node, node A. the transmitter/receiver pairs are connected in the same way but instead of the switch a passive 2×2 coupler 69 is used. For example, the transmitter/receiver pairs 11$_2$, 9$_1$; 11$_1$, 9$_2$ in the left part of nodes A and B as seen in the figure can handle the protected high priority traffic while the low priority traffic is taken care of by the transmitter/receiver pairs 11$_1$, 9$_2$; 11$_2$, 9$_1$ in the right part of the nodes A and B. The low and high priority channels thus use two different paths in the ring. If any section 1*a*, 1*b* of the ring fails, the switch will be set to a state in which the high priority channel is transmitted on the working path. In this case the low priority channel will be redirected to the path that failed and thus no traffic in this channel will reach its destination.

Using this principle, the low priority channel can be added to the traffic in the ring without using any extra filters than those needed for the high priority channel. The bidirectional system requires a pair of wavelength channels, one channel for add and one for drop. If the high priority traffic uses wavelength channel No. 1 for add and wavelength channel No. 2 for drop, the low priority traffic can use the opposite configuration, i.e. wavelength channels No. 2 for add and No. 1 for drop. The use of the same pair of wavelength channels for the two kinds of traffic implies that no extra wavelength is occupied. A conventional unprotected channel would need its own filters and separate wavelength channels, see FIG. 9a.

Only one 2×2 cross-bar switch 33 and one passive 2×2 coupler 69 are needed in the network of FIG. 11 due to the use of bidirectional add/drop filters $5_{e1-2}$, $5_{w\,1-2}$ connected in the ring. If separate add filters and drop filters are used, four switches are needed.

Figure 12:
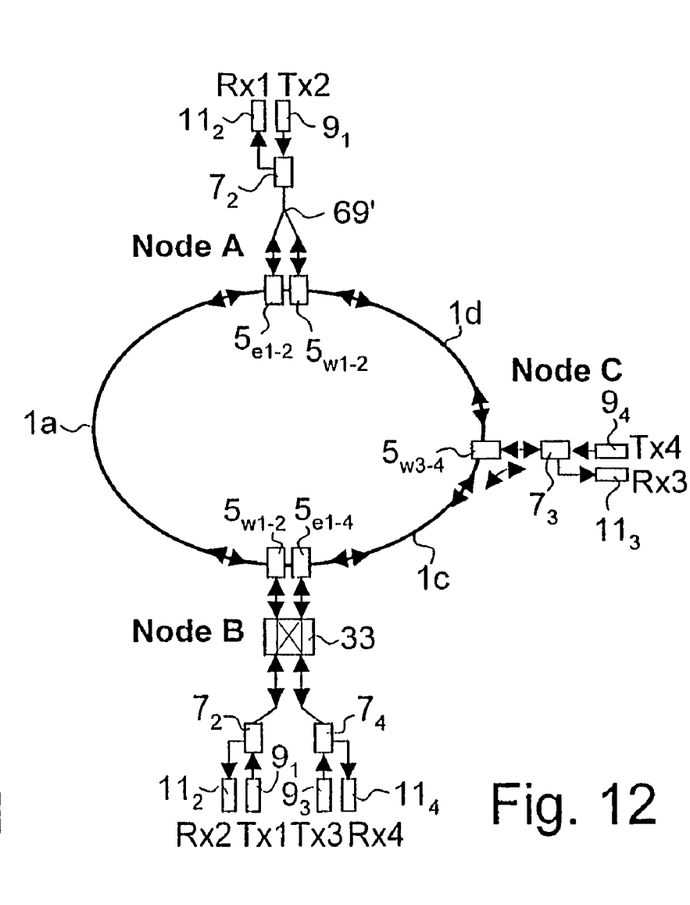
FIG. 12 is a block diagram similar to that of FIG. 11 of an optical bidirectional WDM ring network allowing protected traffic between two nodes and low priority traffic between one of the nodes and a third node.

A second embodiment is shown in FIG. 12. The low priority traffic is here established between node B and a third node C. The node C can be taken to substantially correspond to the left part of node A of FIG. 11, and the left and right sides of node B have been switched. The coupler in node A is here replaced with a 1×2 coupler 69'. The network configuration in FIG. 12 should be compared to that of FIG. 9b, in which a conventional unprotected channel between nodes B and C is used. It can be seen that no extra filter is needed in node B when the channel for low priority traffic is added. However, the right band add/drop $5_{e1-4}$ filter in node B should have a larger bandwidth than the corresponding filter $5_e$ in FIG. 9b because the low priority channels must have separate wavelengths. In FIG. 12. the low priority channel uses wavelength channels Nos. 3 and 4 for the bidirectional traffic. The high priority channel uses wavelength channels Nos. 1 and 2.

The low priority channel in FIG. 12 will only be active if the switch 33 in node B is set to the bar state. A fiber break on the fiber segment 1a extending between nodes A and B and not connected to node C will force the switch into the cross state so that it can restore the high priority traffic to pass on the fiber segments 1c, 1d of the ring, but this action will disable the low priority channel. This will not happen to a conventional unprotected channel since it is independent of other equipment. Furthermore, the low priority channel can be redirected by the switch 33, but it will be stopped by the left filter $5_{e1-2}$ in node B because only wavelength channels Nos. 1 and 2 will pass through. Therefore, channel reuse for the wavelengths used for the unprotected low priority channel is possible.

In the networks described herein any other wavelength channel that is not used for the considered high-priority and low-priority communication can be used for other communication between the nodes shown and/or other nodes, not shown, using the same fiber ring path. Thus, generally other networks using other wavelengths can be superposed on the networks described or the networks described herein can be superposed on other networks using other wavelengths for communication in the common fiber ring path, the other networks e.g. also including other fiber rings in which they can use all possible available wavelengths.

In the networks described herein the transponders for transmitting or transmitter transponders can either be integrated WDM transmitters of the respective client equipment such WDM lasers or be transmit end WDM transponders (TETs) that optically receive their input signals from the respective client equipment. In the same way the transmitters can be conventional WDM transmitters or transmit end WDM transponders (TETs).

In the networks described herein the transponders for receiving can either be integrated receivers of the respective client equipment or be receive end WDM transponders (RETs) that receive their input optical signals from the WDM network and re-transmit them optically to the respective client equipment. In the same way the receivers can be conventional optical receivers or receive end WDM transponders (RETs).

In the networks described herein the crossconnect unit can either be an all optical device or include an electrical switch core provided with opto-electrical receivers connected at the input side and with electro-optical transmitters on the output side.

The principle of fiber protection as described above can be used in networks having a meshed as well as a hubbed traffic pattern.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. An optical WDM ring network including at least two add/drop nodes including a first node and a second node, links of single optical fibers connected in series with each other, each link extending between two of the add/drop nodes and allowing bidirectional traffic between said two of the add/drop nodes on the single optical fiber of the link, the links being connected to form a single ring path so that the ring path includes only one optical fiber path, characterized by a switching element in the first node for switching, for protection purposes, signals from the first node to the second node to travel on a first segment of the ring path or to travel on a second, complementary segment of the ring path, the first node arranged to receive signals from the second node from that segment on which signals from the first node are switched to travel, and the second node arranged to issue signals into the ring path to travel on both the first and second segments, the second node comprising:

a plurality of receivers, a plurality of transmitters, and non-wavelength selective transmitter couplers, each transmitter having a single one of the transmitter couplers connected to it for splitting signals issued by the transmitter in two shares, a first share arranged to travel along the first segment to the first node and a second share arranged to travel along the second segment to the first node, each of the transmitter couplers having first and second outputs, the first output of each transmitter coupler connected to an individual first add element, the first add elements connected in series with each other to combine the first shares of the signals issued by all of the transmitters to a combined signal arranged to travel along the first segment and the second output of each transmitter coupler connected to an individual second add element, the second add elements connected in series with each other to combine the second shares of the signals issued by all of the transmitters to a combined signal arranged to travel along the second segment.

2. An optical WDM ring network including at least two add/drop nodes including a first node and a second node, links of single optical fibers connected in series with each other, each link extending between two of the add/drop nodes and allowing bidirectional traffic between said two of the add/drop nodes on the single optical fiber of the link, the links being connected to form a single ring path so that the ring path includes only one optical fiber path, characterized by
- a switching element in the first node for switching, for protection purposes, signals from the first node to the second node to travel on a first segment of the ring path or to travel on a second, complementary segment of the ring path,
- the first node arranged to receive signals from the second node from that segment on which signals from the first node are switched to travel, and
  - the second node arranged to issue signals into the ring path to travel on both the first and second segments,
- the second node comprising a plurality of receivers and receiver couplers, each receiver having a receiver coupler connected to it for combining possible signals incoming to the receiver from the first and second segments,
- each of the receiver couplers having first and second inputs, the first input of each receiver coupler connected to an individual first drop element, the first drop elements connected in series with each other to receive signals incoming from the first segment, each first drop element deflecting respective signals to the receiver connected to the first drop element, and the second input of each receiver coupler connected to an individual second drop element, the second drop elements connected in series with each other to receive signals incoming from the second segment, each second drop element deflecting respective signals to the receiver connected to the second drop element.

3. An optical WDM ring network including at least two add/drop nodes including a first node and a second node, links of single optical fibers connected in series with each other, each link extending between two of the add/drop nodes and allowing bidirectional traffic between said two of the add/drop nodes on the single optical fiber of the link, the links being connected to form a single ring path so that the ring path includes only one optical fiber path, characterized by
- a switching element in the first node for switching, for protection purposes, signals from the first node to the second node to travel on a first segment of the ring path or to travel on a second, complementary segment of the ring path,
- the first node arranged to receive signals from the second node from that segment on which signals from the first node are switched to travel, and
- the second node arranged to issue signals into the ring path to travel on both the first and second segments,
- each of the first and second nodes being arranged to issue high priority signals and low priority signals, the switching element switching in the first position high priority signals from the first node to the second node to travel on the first segment and in the second position to travel on the second, complementary segment of the ring path,
- the first node arranged to receive high priority signals from the second node from that segment on which the high priority signals from the first node are switched to travel, and
- the second node arranged to issue all its signals, both high and low priority signals, into the ring path to travel on both the first and second segments,
- the switching element allowing in the first position low priority signals from the first node to travel on the second segment and low priority signals to be received in the first node from the same, second segment and allowing in the second position the low priority signals from the first node to travel on the first segment and low priority signals to be received from the same, first segment.

4. An optical WDM ring network according to claim 3, characterized in that the low priority signals are carried on two different WDM wavelength channels, one channel used for signals from the first node and a different channel for signals received by the first node.

5. An optical WDM ring network according to claim 3, characterized in that the high priority signals are carried on two different WDM wavelength channels, a first channel used for signals from the first node to the second node and a second, different channel for signals from the second node to the first node, the low priority signals from the first node carried on the second channel and the low priority signals from the second node carried on the first channel.

6. An optical WDM ring network according to claim 3, characterized in that the high and low priority signals are added to/dropped from traffic in the ring path in the first node by one wavelength selective add/drop filter, in particular a band add/drop filter, for each of the first and second segments of the ring path.

7. An optical WDM ring network according to claim 3, characterized in that the first node comprises, for each of the high and low priority signals,
- at least one receiver,
- at least one transmitter, and
- a drop filter connected to the switching element for directing high and low priority signals, incoming to the first node and passing the switching element, to the respective at least one receiver of the first node and for directing high and low signals issued by the respective at least one transmitter of the first node to the switching element for forwarding the signals to the ring path.

8. An optical WDM ring network according to claim 3, characterized in that the second node comprises
- at least one receiver for the high priority signals,
- at least one transmitter for the high priority signals,
- a non-wavelength selective 2×2 coupler, and
- a drop filter connected to the coupler for directing signals, incoming to the second node and passing the coupler, to the at least one receiver of the second node and for directing signals issued by the at least one transmitter of the second node to the coupler for forwarding the signals to the first node.

9. An optical WDM ring network according to claim 3, characterized in that the low priority signals from the first node are received by the second node and vice versa.

10. An optical WDM ring network according to claim 3, characterized in that the second node comprises a coupler and for each of the high and low priority signals, at least one receiver,
at least one transmitter, and
a drop filter, the drop filters connected to the coupler for allowing high and low priority signals incoming to the second first node to pass to the receivers for both high and low priority signals and for directing high and low signals issued by the transmitters for both high and low priority signals pass to the ring path in the two opposite directions on the first and second segments.

11. An optical WDM ring network according to claim 3, characterized in that both the high and low priority signals are added to/dropped from traffic in the ring path in the second node by one wavelength selective add/drop filter, in particular a band add/drop filter, for each of the first and second segments of the ring path.

12. An optical WDM ring network according to claim 3, characterized in that the low priority signals from the first node are received by a third one of the add/drop nodes, a third node, and the low priority signals received by the first node are transmitted from the third node.

13. An optical WDM ring network according to claim 12, characterized in that the high priority signals are carried on two different WDM wavelength channels and the low priority signals are carried on two other, different WDM wavelength channels.

14. An optical WDM ring network according to claim 12, characterized in that the third node comprises
at least one receiver,
at least one transmitter, and
a drop filter.

15. An optical WDM ring network according to claim 12, characterized in that the low priority signals are added to/dropped from traffic in the ring path in the third node by one wavelength selective add/drop filter, in particular a band add/drop filter.

16. An optical WDM ring network including:
at least two add/drop nodes including a first node and a second node, the first and second nodes communicating with each other, the communication between the first and second nodes performed in two different WDM wavelength channels, one of said two different WDM wavelength channels used for signals from the first node to the second node and a different one of said two WDM wavelength channels used for signals from the second node to the first node,
links of single optical fibers connected in series with each other, each link extending between two of said at least two add/drop nodes and allowing bidirectional traffic between said two of the add/drop nodes on the single optical fiber of the link,
the links connected to form a single ring path so that the ring path includes only one optical fiber path, said first and second nodes dividing the single ring path in a first segment and a second segment that are non-overlapping,
wherein the first node includes
two wavelength selective add/drop filters connected in the single ring path, the signals in said two different WDM wavelength channels added to/dropped from traffic in the single ring path in the first node by the two wavelength selective add/drop filters for each of said first and second segments of the single ring path, and
a switching element connected to the two wavelength selective add/drop filters and outside the single ring path, for switching, for protection purposes, signals from the first node to the second node to travel on the first segment or to travel on the second, complementary segment and the first node thereby receiving signals from the second node from that of said two segments on which signals from the first node are switched to travel, and
wherein the second node has no switching function for the communication with the second node and
includes an optical combining/splitting element connected outside the single ring path, the optical combining/splitting element
splitting signals for the communication from the second node to the first node so that said signals travel on both of said first and second segments, and
receiving signals for communication on both of said first and second segments for the communication from the first node to the second node.

17. The optical WDM ring network of claim 16, wherein also the second node includes two wavelength selective add/drop filters connected in the single ring path, the signals in said two different WDM wavelength channels added to/dropped from traffic in the single ring path in the second node by these two wavelength selective add/drop filters for each of said first and second segments.

18. The optical WDM ring network of claim 16, wherein at least one of the wavelength selective add/drop filters is a band add/drop filter.

19. The optical WDM ring network of claim 16, wherein the first node further comprises
at least one receiver,
at least one transmitter, and
a drop filter connected to the switching element for directing signals of the communication between the first and second nodes, incoming to the first node and passing the switching element, to the at least one receiver of the first node and for directing signals issued by the at least one transmitter of the first drop node to the switching element for forwarding the signals to the second node.

20. The optical WDM ring network of claim 16, wherein the optical combining/splitting element of the second node is a non-wavelength selective coupler and the second node further comprises
at least one receiver,
at least one transmitter, and
a drop filter connected to the non-wavelength selective coupler for directing signals, incoming to the second node from the first node and passing the non-wavelength selective coupler, to the at least one receiver of the second node and for directing signals issued by the at least one transmitter of the second node to the non-wavelength selective coupler for forwarding the signals to the first node.

21. The optical WDM ring network of claim 16, wherein the optical combining/splitting element of the second node includes a plurality of non-wavelength selective transmitter couplers and the second node further comprises
a plurality of receivers, and
a plurality of transmitters, each of the transmitters having a single one of the non-wavelength selective transmitter couplers connected to it for splitting signals issued by the transmitter in two shares, a first share arranged to travel along the first segment to the first node and a second share arranged to travel along the second segment to the first node.

22. The optical WDM ring network of claim 21, wherein the second nodes further includes first add elements connected in series with each other, and second add elements connected in series with each other, each of the non-wavelength selective transmitter couplers have first and second outputs, the first output of each of the non-wavelength selective transmitter couplers connected to an individual one of the first add elements, the first add elements connected to combine first shares of the signals issued by all of the transmitters to a combined signal arranged to travel along the first segment, and the second output of each of each of the non-wavelength selective transmitter couplers connected to an individual one of the second add elements, the second add elements connected to combine the second shares of the signals issued by all of the transmitters to a combined signal arranged to travel along the second segment.

23. The optical WDM ring network of claim 16, wherein the second node further comprises a plurality of receivers and receiver couplers, each of the receivers having a receiver coupler connected to it for combining possible signals incoming to the receiver from the first and second segments.

24. The optical WDM ring network of claim 23, wherein the second node further comprises first drop elements connected in series with each other, and second drop elements connected in series with each other, each of the receiver couplers having first and second inputs, the first input of each of the receiver couplers connected to an individual one of the first drop elements, the first drop elements connected to receive signals incoming from the first segment, each of the first drop elements deflecting respective signals to the receiver connected to the first drop element, and the second input of each of the receiver couplers connected to an individual one of the second drop elements, the second drop elements connected to receive signals incoming from the second segment, each of the second drop elements deflecting respective signals to the receiver connected to the second drop element.

25. The optical WDM ring network of claim 16, wherein each of the first and second nodes is arranged to issue high priority signals and low priority signals, the switching element switching in a first position the high priority signals from the first node to the second node to travel on the first segment and in a second position to travel on the second, complementary segment of the ring path, the first node arranged to receive the high priority signals from the second node from that segment on which the high priority signals from the first node are switched to travel, and the second node arranged to issue all its signals, both the high and low priority signals, into the ring path to travel on both the first and second segments.

26. The optical WDM ring network of claim 25, wherein the low priority signals are carried on two different WDM wavelength channels, one of said two different WDM wavelength channels used for signals from the first node and a different one of said two different WDM wavelength channels used for signals received by the first node.

27. The optical WDM ring network of claim 25, wherein the high priority signals are carried on said two different WDM wavelength channels, a first one of said two different WDM wavelength channels used for signals from the first node to the second node and a second, different one of said two different WDM wavelength channels used for signals from the second node to the first node, the low priority signals from the first node carried on the second one of said two different WDM wavelength channels and the low priority signals from the second node carried on the first one of said two different WDM wavelength channels.

28. The optical WDM ring network of claim 25, wherein the first node further comprises, for each of the high and low priority signals, at least one receiver, at least one transmitter, and a drop filter connected to the switching element for directing high and low priority signals, incoming to the first node and passing the switching element, to the respective at least one receiver of the first node and for directing high and low priority signals issued by the respective at least one transmitter of the first node to the switching element for forwarding the signals to the ring path.

29. The optical WDM ring network of claim 25, wherein the optical combining/splitting element of the second node includes a non-wavelength selective 1×2 coupler and the second node further comprises at least one receiver for the high priority signals, at least one transmitter for the high priority signals, a drop filter connected to the non-wavelength selective 1×2 coupler for directing signals, incoming to the second node and passing the non-wavelength selective 1×2 coupler, to the at least one receiver for the high priority signals and for directing signals issued by the at least one transmitter for the high priority signals node to the non-wavelength selective 1×2 coupler for forwarding the signals to the first node.

30. The optical WDM ring network of claim 25, wherein the low priority signals from the first node are received by the second node and vice versa.

31. The optical WDM ring network of claim 25, wherein the optical combining/splitting element of the second node includes a coupler and the second node for each of the high and low priority signals includes at least one receiver, at least one transmitter, and a drop filter, the drop filters connected to the coupler for allowing high and low priority signals incoming to the second first node to pass to the receivers for both high and low priority signals and for directing high and low signals issued by the transmitters for both high and low priority signals pass to the ring path in two opposite directions and/or on the first and second segments.

32. The optical WDM ring network of claim 25, wherein the second node includes two wavelength selective add/drop filters, one for each of the first and second segments of the ring path and both the high and low priority signals are added to/dropped from traffic in the ring path in the second node by these wavelength selective add/drop filters.

33. The optical WDM ring network of claim 25, wherein the low priority signals from the first node are received by a third one of the at least two add/drop nodes, a third node, and the low priority signals received by the first node are transmitted from the third node.

34. The optical WDM ring network of claim 33, wherein the high priority signals are carried on two different WDM wavelength channels and the low priority signals are carried on two other, different WDM wavelength channels.

35. The optical WDM ring network of claim 33, wherein the third node comprises
    at least one receiver,
    at least one transmitter, and
    a drop filter.

36. The optical WDM ring network of claim 33, wherein the low priority signals are added to/dropped from traffic in the ring path in the third node by one wavelength selective add/drop filter.

* * * * *